(12) United States Patent
Beer (10) Patent No.: US 8,960,158 B2
(45) Date of Patent: Feb. 24, 2015

(54) METHOD AND DEVICE FOR DETERMINING A FUEL PRESSURE PRESENT AT A DIRECT INJECTION VALVE

(75) Inventor: Johannes Beer, Regensburg (DE)

(73) Assignee: Continental Automotive GmbH, Hanover (DE)

( * ) Notice: Subject to any disclaimer, the term of this patent is extended or adjusted under 35 U.S.C. 154(b) by 395 days.

(21) Appl. No.: 13/498,268

(22) PCT Filed: Aug. 31, 2010

(86) PCT No.: PCT/EP2010/062687
§ 371 (c)(1),
(2), (4) Date: Mar. 26, 2012

(87) PCT Pub. No.: WO2011/036035
PCT Pub. Date: Mar. 31, 2011

(65) Prior Publication Data
US 2012/0185147 A1    Jul. 19, 2012

(30) Foreign Application Priority Data
Sep. 25, 2009 (DE) .......................... 10 2009 043 124

(51) Int. Cl.
*F02D 41/30* (2006.01)
*F02D 41/20* (2006.01)
(Continued)

(52) U.S. Cl.
CPC ................ *F02D 41/20* (2013.01); *F02D 41/22* (2013.01); *F02D 41/2416* (2013.01); *F02D 41/2432* (2013.01); *F02D 41/2464* (2013.01); *F02D 2041/2003* (2013.01); *F02D 2041/2051* (2013.01); *F02D 2041/2055* (2013.01); *F02D 2041/223* (2013.01); *F02D 2041/224* (2013.01); *F02D 2041/228* (2013.01);
(Continued)

(58) Field of Classification Search
CPC .......................... F02D 41/20; F02D 2041/2051
USPC ............. 701/103; 123/490; 73/35.12, 114.43, 73/114.45
See application file for complete search history.

(56) References Cited

U.S. PATENT DOCUMENTS

| | | | |
|---|---|---|---|
| 5,988,143 A | 11/1999 | Dietz et al. | 123/458 |
| 6,053,150 A | 4/2000 | Takahashi et al. | 123/501 |

(Continued)

FOREIGN PATENT DOCUMENTS

| | | | | |
|---|---|---|---|---|
| CN | 1403697 A | 3/2003 | | F02D 41/06 |
| DE | 3730523 A1 | 3/1989 | | H01F 7/18 |

(Continued)

OTHER PUBLICATIONS

German Office Action for Application No. 10 2009 043 124.1-26 (3 pages), Jun. 7, 2010.

(Continued)

*Primary Examiner* — Hai Huynh
(74) *Attorney, Agent, or Firm* — King & Spalding L.L.P.

(57) ABSTRACT

A method for determining a fuel pressure present at a direct injection valve comprising a solenoid drive comprises (a) detecting a voltage induced in the solenoid drive within a time span comprising a closing point in time of the direct injection valve, and (b) determining the fuel pressure based on the detected induced voltage. Further, a corresponding device, a common rail system, a motor vehicle, and a computer program for determining the fuel pressure of a valve comprising a solenoid drive are provided.

15 Claims, 5 Drawing Sheets

(51) Int. Cl.
 *F02D 41/22* (2006.01)
 *F02D 41/24* (2006.01)

(52) U.S. Cl.
 CPC ............... *F02D 2200/0602* (2013.01); *F02D 2200/0604* (2013.01); *F02D 2400/08* (2013.01); *Y02T 10/40* (2013.01)
 USPC ........................................ 123/490; 701/103

(56) References Cited

U.S. PATENT DOCUMENTS

| | | | | |
|---|---|---|---|---|
| 6,712,047 | B2 | 3/2004 | Rueger | 123/479 |
| 7,305,971 | B2 | 12/2007 | Fujii | 123/479 |
| 8,738,218 | B2 * | 5/2014 | Suda et al. | 701/30.3 |
| 2009/0019926 | A1 | 1/2009 | Sommerer | 73/114.43 |
| 2012/0185147 | A1 | 7/2012 | Beer | 701/102 |

FOREIGN PATENT DOCUMENTS

| | | | | |
|---|---|---|---|---|
| DE | 19800760 | A1 | 8/1998 | F02D 41/02 |
| DE | 10014737 | A1 | 10/2001 | F02D 41/20 |
| DE | 102006000021 | A1 | 8/2006 | F02D 41/22 |
| DE | 102007053408 | A1 | 5/2009 | F02D 41/00 |
| DE | 102008040244 | A1 | 1/2010 | F02D 41/00 |
| DE | 102009043124 | A1 | 3/2011 | F02D 41/00 |
| EP | 2014900 | A1 | 1/2009 | F02D 41/22 |
| JP | 10238392 | A | 9/1998 | F02B 77/08 |
| JP | 3855447 | B2 | 12/2006 | F02D 41/24 |
| WO | 2011/036035 | A1 | 3/2011 | F02D 41/20 |

OTHER PUBLICATIONS

International Search Report and Written Opinion for Application No. PCT/EP2010/062687 (23 pages), Dec. 13, 2010.

Chinese Office Action, Application No. 201080042762.8, 11 pages, Jul. 3, 2014.

* cited by examiner

METHOD AND DEVICE FOR DETERMINING A FUEL PRESSURE PRESENT AT A DIRECT INJECTION VALVE

CROSS-REFERENCE TO RELATED APPLICATIONS

This application is a U.S. National Stage Application of International Application No. PCT/EP2010/062687 filed Aug. 31, 2010, which designates the United States of America, and claims priority to German Application No. 10 2009 043 124.1 filed Sep. 25, 2009, the contents of which are hereby incorporated by reference in their entirety.

TECHNICAL FIELD

This disclosure relates to the technical field of the determination of a fuel pressure present at a direct injection valve comprising a solenoid drive. In particular, the present disclosure relates to the determination of the fuel pressure for a common rail system in a motor vehicle, and to a corresponding device and a computer program for determining the fuel pressure present at a direct injection valve with a solenoid drive.

BACKGROUND

In order to operate modern internal combustion engines and to comply with strict emission limiting values, an engine controller may determine, by means of what is referred to as the cylinder charging model, the air mass which is enclosed in a cylinder per working cycle. In accordance with the modeled air mass and the desired ratio between the air quantity and fuel quantity (lambda), the corresponding fuel quantity setpoint value (MFF_SP) is injected via an injection valve which is also referred to in this document as an injector or direct injection valve. As a result, the fuel quantity which is to be injected can be dimensioned in such a way that a lambda value which is optimum for the post-treatment of an exhaust gas in the catalytic converter is present. For direct-injection spark ignition engines with internal mixture formation, the fuel may be injected directly into the combustion chamber with a pressure in the range from 40 to 200 bar.

Typically, the main requirement of the injection valve is, in addition to a seal against uncontrolled outflow of fuel and conditioning of the jet of the fuel to be injected, also chronologically precise metering of the pilot-controlled injection quantity. In particular in the case of supercharged direct-injection spark ignition engines, a very large quantity spread of the required fuel quantity may be necessary. It may therefore be necessary, for example for the supercharged operation at full load of the engine, to meter a maximum fuel quantity MFF_max per working cycle, while during operation near to idling a minimum fuel quantity MFF_min has to be metered. The two characteristic variables MFF_max and MFF_min here define the limits of the linear working range of the injection valve.

For direct injection valves with a solenoid drive, the spreading of a quantity, which is defined as the quotient between the maximum fuel quantity MFF_max and the minimum fuel quantity MFF_min at constant fuel pressure, is approximately 15. For future engines with the focus on $CO_2$ reduction, the cubic capacity of the engines is reduced and the rated power of the engine is maintained or even raised by means of corresponding engine supercharging mechanisms. As a result, the requirement for the maximum fuel quantity MFF_max corresponds at least to the requirements of an induction engine with a relatively large cubic capacity. However, the minimum fuel quantity MFF_min is typically determined by means of operation near to idling and the minimum air mass in the overrun mode of the engine which is reduced in cubic capacity, and said minimum fuel quantity MFF_min is therefore reduced. In addition, direct injection permits the total fuel mass to be distributed over multiple pulses, which permits more stringent emission limiting values to be complied with, for example in a catalytic converter heating mode by means of what is referred to as mixture stratification and a later ignition time. For the abovementioned reasons, a raised requirement both in terms of the quantity spread and the minimum fuel quantity MFF_min may occur for future engines.

In known injection systems, a significant deviation of the injection quantity from the nominal injection quantity typically occurs in the case of injection in the range of a minimum fuel quantity. This systematically occurring deviation is due essentially to fabrication tolerances at the injector, as well as to tolerances of the output stage which actuates the injector in the engine controller. Further additional associated influencing variables are the fuel pressure, the cylinder internal pressure during the injection process and possible variants of the supply voltage.

The electrical actuation of a direct injection valve usually takes place by means of current-regulated full-bridge output stages of the engine controller. A full-bridge output stage makes it possible to apply a voltage of the on-board power system of the motor vehicle, and alternatively a boosting voltage, to the injection valve. The boosting voltage is frequently also referred to as a boost voltage (U_boost) and may be, for example, approximately 60 V.

Figure 5:
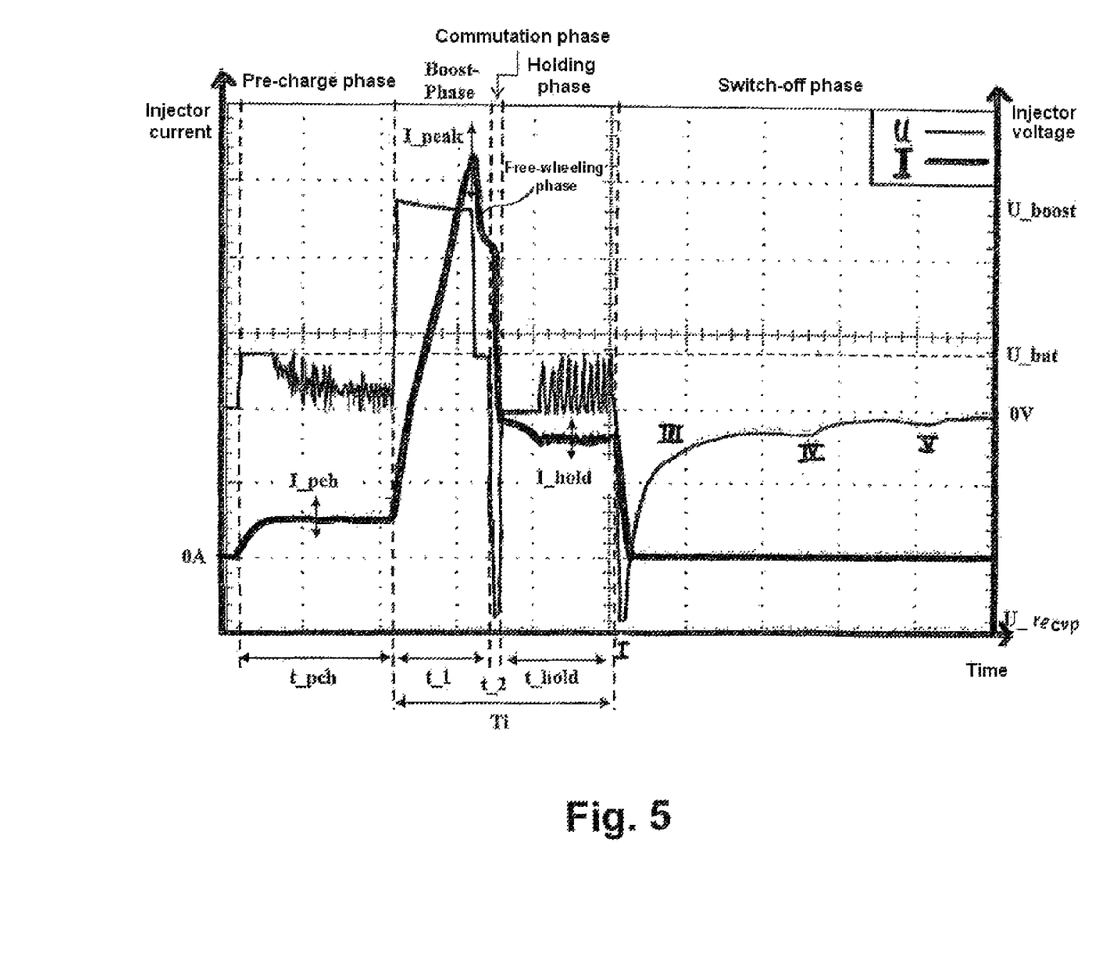
FIG. 5 shows a typical current/actuation profile and the corresponding voltage profile for a direct injection valve having a solenoid drive.

FIG. 5 shows a typical current actuation profile I (thick continuous line) for a direct-injection valve with a solenoid drive. FIG. 5 also shows the corresponding voltage U (thin continuous line) which is present at the direct injection valve. The actuation is divided into the following phases:

A) Pre-Charge-Phase:

During this phase with the duration t_pch, the battery voltage U_bat, which corresponds to the voltage of the on-board power system of the motor vehicle, is applied to the solenoid drive of the injection valve by the bridge circuit of the output stage. When a current setpoint value I_pch is reached, the battery voltage U_bat is switched off by a two-point regulator, and after a further current threshold has been undershot U_bat is switched on again.

B) Boost-Phase:

The pre-charge phase is followed by the boost phase. For this purpose, the boosting voltage U_boost is applied to the solenoid drive by the output stage until a maximum current I_peak is reached. The rapid current build-up speeds up the opening of the injection valve. After I_peak has been reached, there follows a free-wheeling phase up to the expiry of t_1, during which free-wheeling phase the battery voltage U_bat is again applied to the solenoid drive. The time period Ti of the electrical actuation is measured from the start of the boost phase. This means that the transition to the free-wheeling phase is triggered by the predefined maximum current I_peak being reached. The duration t_1 of the boost phase is permanently predefined as a function of the fuel pressure.

C) Commutation Phase:

After t_1 expires there follows a commutation phase. Switching off the voltage results here in a self-induction voltage which is limited essentially to the boosting voltage U_boost. The limitation of the voltage during the self-induction is composed of the sum of U_boost as well as the forward voltages of a recuperation diode and of what is referred to as a free-wheeling diode. The sum of these voltages is referred to below as the recuperation voltage. On account of a differential voltage measurement, on which FIG. 5 is based, the recuperation voltage is in a negative form in the commutation phase.

The recuperation voltage results in a flow of current through the coil, which flow reduces the magnetic field to a minimum. The commutation phase is timed and depends on the battery voltage U-bat and on the duration $t\_1$ of the boost phase. The commutation phase ends after the expiry of a further time period $t\_2$.

D) Holding Phase:

The commutation phase is followed by what is referred to as the holding phase. Here, again the setpoint value for the holding current setpoint value I_hold is adjusted using the battery voltage U_bat by means of a two-point regulator.

E) Switch-off Phase: Switching off the voltage results in a self-induction voltage which, as explained above, is limited to the recuperation voltage. This results in a flow of current through the coil, which flow then reduces the magnetic field. After the recuperation voltage, which is in a negative form here, has been exceeded, no current flows anymore. This state is also referred to as "open coil". Owing to the ohmic resistances of the magnetic material, the eddy currents which are induced during the field reduction of the coil decay. The reduction in the eddy currents leads in turn to a change in the field of the solenoid and therefore to a voltage induction. This induction effect leads to the voltage value at the injector rising to zero starting from the level of the recuperation voltage in accordance with the profile of an exponential function. After the reduction of the magnetic force, the injector closes by means of the spring force and the hydraulic force caused by the fuel pressure. The injected fuel quantity is therefore overall a function of the valve-opening behavior and valve-closing behavior as well as of the fuel pressure present at the valve.

SUMMARY

In one embodiment, a method for determining a fuel pressure present at a direct injection valve comprising a solenoid drive comprises: detection of a voltage induced in the solenoid drive, within a time period which includes a closing time of the direct injection valve, and determination of the fuel pressure on the basis of the detected induced voltage.

In a further embodiment, a maximum value, detected in the solenoid drive, of the induced voltage is used to determine the fuel pressure. In a further embodiment, a value for the determined fuel pressure present at the direct injection valve is used as a virtual value for a further fuel pressure present at at least one further direct injection valve. In a further embodiment, the method also comprises: detection of a further induced voltage which is induced in a further solenoid drive of a further direct injection valve, within a time period which includes a closing time of the further direct injection valve, and determination of a further fuel pressure on the basis of the detected further induced voltage. In a further embodiment, the method also comprises: detection of the fuel pressure by means of a pressure sensor, comparison of the fuel pressure determined on the basis of the detected induced voltage with the fuel pressure detected by the pressure sensor, and outputting of a fault message if the determined fuel pressure deviates from the measured fuel pressure by more than a predefined threshold value.

In a further embodiment, the fuel pressure is determined from a previously known characteristic diagram of maximum values of induced voltages and associated fuel pressures. In a further embodiment, the characteristic diagram has been determined by means of a calibration method which comprises: operation of the direct injection valve for various fuel pressures, wherein an induced voltage is measured for each fuel pressure, and storage of a plurality of value pairs which each comprise a pressure value and an associated voltage value. In a further embodiment, the direct injection valve is operated for various fuel pressures under predefined constant operating conditions. In a further embodiment, the constant operating conditions are defined by maintaining a stoichiometric air ratio, a predefined cooling water temperature, a predefined oil temperature and/or a predefined temperature for a control unit of an internal combustion engine comprising the direct injection valve. In a further embodiment, the method also comprises adaptation of the value pairs stored in the characteristic diagram, by means of a regression curve.

In another embodiment, a device for determining a fuel pressure present at a direct injection valve comprising a solenoid drive includes: a detection unit for detecting a voltage induced in the solenoid drive, within a time period which includes a closing time of the direct injection valve, and an evaluation unit for determining the fuel pressure on the basis of the detected voltage.

In another embodiment, a common rail system for a motor vehicle having an internal combustion engine includes at least one direct injection valve for injecting fuel into a combustion chamber of the internal combustion engine, and a device for determining a fuel pressure present at a direct injection valve comprising a solenoid drive, the device including: a detection unit for detecting a voltage induced in the solenoid drive, within a time period which includes a closing time of the direct injection valve, and an evaluation unit for determining the fuel pressure on the basis of the detected voltage. In another embodiment, a motor vehicle having such a common rail system.

In another embodiment, a computer program is provided for determining a fuel pressure present at a direct injection valve comprising a solenoid drive. The computer program is configured to control a method for determining the fuel pressure by: detection of a voltage induced in the solenoid drive, within a time period which includes a closing time of the direct injection valve, and determination of the fuel pressure on the basis of the detected induced voltage.

BRIEF DESCRIPTION OF THE DRAWINGS

Example embodiments will be explained in more detail below with reference to figures, in which.

DETAILED DESCRIPTION

Some embodiments provide a method for determining the fuel pressure at a direct injection valve having a solenoid drive, which method comprises (a) detection of a voltage induced in the solenoid drive, within a time period which includes a closing time of the direct injection valve, and (b) determination of the fuel pressure on the basis of the detected induced voltage.

The described method for determining the fuel pressure is based on the realization that a voltage signal which is caused by the movement of the magnet armature through induction can be used in the coil to characterize the movement sequence of the magnet armature. It has been discovered that the movement sequence of the magnet armature is, for its part, in fact dependent on the fuel pressure present at the direction injection valve. To be more precise, the resulting force which occurs at the magnet armature and which causes the closing movement of the injection valve depends on the fuel pressure, on the spring force and on the dynamics of the magnetic field reduction, which is determined, in particular, by the eddy currents induced by the change in the field.

The voltage profile of the voltage induced in the currentless coil is therefore caused to a certain extent by the movement of the magnet armature and therefore indirectly to a certain extent by the fuel pressure. Through suitable evaluation of the time profile of the voltage induced in the coil, the proportion of the movement-induced voltage which is based on the relative movement between the magnet armature and the coil can be determined at least to a good approximation. The detection of the induced voltage therefore automatically provides information about the movement sequence, which information permits precise conclusions to be drawn about the fuel pressure which is present, and said information can therefore serve for the determination of the fuel pressure. For this purpose, both the profile of the movement-induced voltage and the closing time in the switch-off phase are used to determine the fuel pressure.

Embodiments of the disclosed method may be carried out online in an engine control unit. Therefore, for example oscillations in the fuel pressure in a rail can cause an individually different fuel pressure to occur at each injection valve. The position of the injection valve in a common rail system can also have effects on the fuel pressure through the described oscillation. These dependencies can be detected for every injection valve and be compensated by changed actuation. On the other hand, this is typically not possible with a fuel pressure sensor which is configured centrally for all the injection valves, since said sensor is typically located in the rail of the common rail system.

According to one exemplary embodiment, a maximum value, detected in the solenoid drive, of the induced voltage is used to determine the fuel pressure.

This exemplary embodiment is based on the realization that the maximum value for the induced voltage, which maximum value can be detected easily, is dependent on the value of the fuel pressure which is present. The maximum value of the induced voltage occurs here at the closing time when the armature and valve needle experience their greatest change in speed owing to the impacting in the valve seat, i.e., at the mechanical closing time. Suitable evaluation can also permit a relationship to be formed here between the maximum value of the induced voltage and the value of the fuel pressure. This may provide the advantage that only a single value for the induced voltage has to be detected and the value for the fuel pressure can be determined therefrom. It has become apparent that there is essentially a linear relationship between the maximum value of the induced voltage and the value of the fuel pressure.

According to a further exemplary embodiment, a value for the determined fuel pressure present at the direct injection valve is used as a virtual value for a further fuel pressure present at at least one further direct injection valve.

For an engine controller it may be advantageous to use as few electronic components as possible. This may lead to a reduction in the required computing power and also to a reduction in the electronic components themselves which have to be installed. In particular, it may be possible to dispense with the fuel pressure sensor which is configured centrally for all the injection valves, as is the case in what is referred to as a conventional engine according to the common rail principle.

According to a further exemplary embodiment, a method also comprises (a) detection of a further induced voltage which is induced in a further solenoid drive of a further direct injection valve, within a time period which includes a closing time of the further direct injection valve, and (b) determination of a further fuel pressure on the basis of the detected further induced voltage.

This exemplary embodiment may be advantageous in implementing a complex engine controller which permits individual adaptation of the actuation of a plurality of direct injection valves, wherein the individual actuation is based on informative values of the fuel pressure for each of the plurality of injection valves. In particular, the injection quantities for each of the direct injection valves can be adapted. The actuation which is based on adaptation of a plurality of direct injection valves on the basis of individual data items can then lead to a reduction in the fuel demand, to improved combustion of the fuel and/or to a reduction in the emission of pollutants.

According to a further exemplary embodiment, a method also comprises (a) detection of the fuel pressure by means of a pressure sensor, (b) comparison of the fuel pressure determined on the basis of the detected induced voltage with the fuel pressure detected by the pressure sensor, and (c) outputting of a fault message if the determined fuel pressure deviates from the measured fuel pressure by more than a predefined threshold value.

If recourse is to be made to a common fuel pressure sensor, the fuel pressure sensor can be monitored by means of the additional information which is obtained via the fuel pressure of an individual direct injection valve or of a plurality of direct injection valves. If the fuel pressure which is determined deviates from the fuel pressure which is measured by the fuel pressure sensor to such a high degree that a threshold value is exceeded, a following fault message can give rise to different measures.

It may therefore be possible, for example in the case of a discrepancy between the pressure value of the fuel pressure sensor and a pressure value determined by means of the described method, for re-calibration of the fuel pressure sensor to take place automatically. Furthermore, if, for example, a specific injection valve generates the fault message, it may be found that the fuel supply for this injection valve is automatically re-configured. Furthermore, the requirement for maintenance of the vehicle can also be output via a terminal in a passenger cell.

According to a further exemplary embodiment, the fuel pressure is determined from a previously known characteristic diagram of maximum values of induced voltages and associated fuel pressures.

The previously known characteristic diagram may preferably be a unidimensional characteristic diagram in which, in each case, a value for the fuel pressure is assigned to a detected induced voltage value. This characteristic diagram can already be predefined by a manufacturer of injection valves or injection systems, wherein the injection systems can comprise both the injection valves and the means of controlling the injection valves. The characteristic diagram can, as also described below, also be determined experimentally by comparison with measured values of a conventional fuel pressure sensor.

According to a further exemplary embodiment, the characteristic diagram has been determined by a calibration method which comprises (a) operation of the direct injection valve for various fuel pressures, wherein an induced voltage is measured for each fuel pressure, and (b) storage of a plurality of value pairs which each comprise a pressure value and an associated voltage value.

In order to determine the characteristic diagram it may be advantageous to determine a plurality of value pairs composed of a voltage value and a value for the fuel pressure. The determination process should preferably comprise values for the fuel pressure which are obtained for different fuel pressures. In particular, the underlying fuel pressures can include the entire range, or at least a wide range, of operating fuel pressures for operation of an internal combustion engine with direct injection valves. The characteristic diagram can be obtained using a direct injection valve on a test bench, i.e., a characteristic diagram which is obtained for an injection valve which serves as a reference can be used for all direct injection valves of the same type. Furthermore, the characteristic diagram can be determined separately for each direct injection valve. After the determination of the characteristic diagram, the values which are available to the engine controller are stored.

According to a further exemplary embodiment, the direct injection valve is operated for various fuel pressures under predefined constant operating conditions.

In order to arrive at reliable values for the characteristic diagram, it is advantageous to provide constant operating conditions because the relationship between the induced voltage and the fuel pressure can easily be derived. The calibration of the fuel sensor and the calibration of the system can be implemented particularly easily in a case when a multiplicity of influencing factors, which could falsify the results, are eliminated by keeping them constant.

According to a further exemplary embodiment, the constant operating conditions are defined by maintaining (a) a stoichiometric air ratio, (b) a predefined cooling water temperature, (c) a predefined oil temperature and/or (d) a predefined temperature for a control unit of an internal combustion engine comprising the direct injection valve.

In this context, each of the values from the group of the stoichiometric air ratio, the cooling water temperature, the oil temperature and the temperature of the control unit may be assigned a specific bandwidth for the respective value. The cooling water temperature may, in particular, be defined as the temperature of the cooling water for the internal combustion engine and/or the temperature of the cooling water with which the engine block of the internal combustion engine is cooled.

According to a further exemplary embodiment, the method also comprises adaptation of the value pairs stored in the characteristic diagram, by means of a regression curve.

A series of theoretical mathematical models may be used to increase the reliability of the value pairs stored in the characteristic diagram. It is therefore possible, as is known, to determine for n value pairs, which are input as points in a two-dimensional coordinate system, a polynomial of the n−1th degree which is in contact with all the points. In particular, the regression curve may also be a regression straight line. A regression curve whose parameters have been defined in this way provides the advantage that intermediate values for the fuel pressure can also be determined for intermediate values of the induced voltage.

A further advantage may be that only a small number of parameters have to be stored in a nonvolatile fashion in order to obtain intermediate values of the fuel pressure for intermediate values of the detected induced voltage.

According to a further aspect, a device for determining a fuel pressure present at a direct injection valve comprising a solenoid drive comprises (a) a detection unit for detecting a voltage induced in the solenoid drive, within a time period which includes a closing time of the direct injection valve, and (b) an evaluation unit for determining the fuel pressure on the basis of the detected voltage.

The described device for determining the fuel pressure is also based on the realization that a voltage signal caused by the movement of the magnet armature through induction in the coil to characterize the movement sequence of the magnet armature. The evaluation unit can determine the fuel pressure on the basis of the voltage brought about by the movement sequence of the magnet armature in the coil.

According to a further exemplary embodiment, a common rail system for a motor vehicle having an internal combustion engine comprises (a) at least one direct injection valve for injecting fuel into a combustion chamber of the internal combustion engine, and (b) a described device for determining a fuel pressure.

Direct injection valves having a solenoid drive are customary, in particular, for a common rail system in motor vehicles, with the result that the determination of the fuel pressure present at a direct injection valve can be used, in particular for common rail systems.

According to a further aspect, a computer program for ascertaining a fuel pressure of a valve comprising a solenoid drive, in particular a direct injection valve for an engine of a motor vehicle, is disclosed. The computer program is embodiment in non-transitory computer-readable media is configured to perform the method described above for determining the fuel pressure of a valve comprising a solenoid drive, when said computer program is executed by a processor.

Within the sense of this document, the naming of such a computer program is equivalent to the concept of a program element, of a computer program product and/or of a computer-readable medium which contains instructions for controlling a computer system, in order to coordinate the method of operation of a system and/or of a method in a suitable way in order to obtain the effects which are linked to the methods disclosed herein.

The computer program can be implemented as a computer-readable instruction code in any suitable programming language such as, for example, in JAVA, C++ etc. The computer program can be stored on a computer-readable storage medium (CDF-Rom, DVD, Bluray disk, interchangeable disk drive, volatile or nonvolatile memory, installed memory/processor etc.). The instruction code may program a computer or another programable device such as, in particular, a control unit for an engine of a motor vehicle, in such a way that the desired functions are carried out. In addition, the computer program can be made available on a network such as, for example, the Internet, from which it can be downloaded by a user when required.

Certain embodiments can be implemented either by means of a computer program, i.e., a piece of software, or by means of one or more specific electrical circuits, i.e., using hardware or in any desired hybrid form, i.e. by means of software components and hardware components.

To summarize, one aspect of the disclosure can be considered to be the realization that, after the actuation current is switched off, the closing movement of the magnet armature and of the connected valve needle leads to the injector voltage being influenced as a function of the speed. In particular, by evaluating the injector voltage after the actuation current is switched off, the mechanical closing time of the valve needle can be determined. An effect which occurs in this context is that a coil-driven injection valve experiences a reduction in the magnetic force after the injector current is switched off. A resulting force which arises from the spring bias and the fuel pressure present accelerates the magnet armature and the valve needle in the direction of a valve seat. In this context, the magnet armature and the valve needle reach their maximum speed before they impact on the valve seat. With this maximum speed, an air gap between the coil core and the magnet armature becomes larger. Owing to the movement of the magnet armature and the associated increase in the air gap, the remanent magnetism of the magnet armature gives rise to a voltage in the injector coil owing to movement induction. The maximum change in this induction voltage at the injector coil, which is caused by the maximum change in speed of the magnet armature and the connected valve needle, occurs at the time of mechanical closure of the valve needle. The occurrence of the maximum value of the movement-induced voltage therefore correlates with the mechanical closing of the injection valve.

The voltage level of the maximum induction voltage can be used to determine the fuel pressure present at the direct injection valve, since the maximum speed of the valve needle brings about the maximum value of the induced voltage, and the maximum speed is dependent on the fuel pressure. In a time interval I, which contains an expected closing time, the maximum value of the voltage difference $\Delta U\_INJ_{max}$ can therefore be determined, which maximum value is obtained as a maximum value of a voltage for a reference model minus the induced voltage.

$$\Delta U\_INJ_{max} = \max\{U_{INJ\_MDL}(t) - U_{INJ\_MES}(t) | \epsilon I\} \quad (1)$$

for $$I = [t_{Close\_Expected} = \Delta t, t_{Close\_Expected} + \Delta t] \quad (2)$$

and $$U_{INJ\_MDL}(t) = U_{start} \cdot [1 - \exp\{t/\tau(\theta, I = I_{hold})\}] \quad (3).$$

A simple reference model is used as the basis for $U_{INJ\_MDL}(t)$, wherein the value $U_{start}$ is defined by the value $U_{INJ\_MES}(t)$ at the time t=0 and an injector temperature θ and $I_{hold}$ together form a time constant.

For any desired value of the detected maximum value of the induced voltage $\Delta U\_INJ_{max}$, a corresponding fuel pressure FUP shall be able to be specified and/or determined in the operating method. A general and initially unknown relationship of $\Delta U\_INJ_{max}$ and FUP, $$FUP = f(\Delta U\_INJ_{max}), \quad (4)$$

which may be a precondition for the operating method, may therefore be determined in advance in a calibration measurement.

Before the use of the operating method, value pairs may firstly be determined with the calibration measurement, which value pairs are obtained for certain predefined pressures $FUP_n$ measured by a pressure sensor and corresponding measured maximum values $\Delta U\_INJ_{max\_n}$. A relationship $$FUP_n = f(\Delta U\_INJ_{max\_n}), \quad (5)$$

may serve as a precondition for the general function (4).

In order to obtain the N arbitrary value pairs for predefined fuel pressures $FUP_n$ and detected maximum values $\Delta U\_INJ_{max\_n}$ (1≤n≤N), an offline calibration on a reference model is suitable. By means of laboratory measurement on a direct injection valve serving as a reference, the value pairs can be used in advance for all the direct-injection engines manufactured.

Furthermore, an individual online calibration can take place. For each individual direct injection valve i, the value pair can be determined from a predefined fuel pressure, measured with the fuel pressure sensor, $FUP_i$ and detected maximum values $\Delta U\_INJ_{max\_i}$, in order to obtain the relationship (5).

A precondition for both calibration measurements may be that at least one of the following different conditions is met: (a) the fuel pressure sensor which is used functions correctly. (b) The combustion in the internal combustion engine takes place in a virtually steady-state fashion in the homogeneous operating mode with stoichiometric air/fuel ratio in the partial load range. (c) In the selected operating range, a variation of the fuel pressure is possible in an emission-neutral fashion. (d) There is no multiple injection and no negative injector energization for accelerating the closing of the injector. (e) For the temperature of the cooling water, of the oil and of the control unit in each case a temperature interval is defined for the execution, which interval is complied with during the measurement.

During the measurement, the fuel pressure ($FUP_n$) is preferably kept constant and is increased from an initial setpoint value $FUP_{n\_min}$ at 40 bar to a maximum value $FUP_{n\_max}$ in increments of ΔFUP. The value at which the direct injection valve can still be operated without difficulty may be defined as the maximum value $FUP_{n\_max}$ for the fuel pressure. At each constant fuel pressure $FUP_n$, a multiplicity of measurements may take place, which can be averaged so that mean values $FUP_{n\_mean}$ and $\Delta U\_INJ_{max\_n\_mean}$ can be calculated and stored for the value pairs.

After the calibration measurement the value pairs from $FUP_{n\_mean}$ and $\Delta U\_INJ_{max\_n\_mean}$ may serve as characteristic diagram reference points on their corresponding axes. A standard deviation can be determined for each reference point or each value pair. The values for the characteristic diagram may be stored in a nonvolatile fashion and may serve to determine the fuel pressure FUP.

After the calibration measurement, a polynomial formulation may be applied as an option, such as for example a polynomial formulation of the $1^{st}$ order.

By applying the method of the least mean square, a regression straight line can be determined for which the following applies:

$$FUP = x0 + x1 \cdot \Delta U\_INJ_{max} \quad (6)$$

In this context, the model parameters x0 and x1 can be stored in a nonvolatile fashion.

All the calibration measurements can be determined individually for each individual direct injection valve in a common rail system.

The calibration measurement can therefore be used to serve as a basis for the determination of the fuel pressure which is present at any desired direct injection valve with a solenoid drive. Therefore, the determination of the fuel pressure from the voltage induced in the solenoid drive of the direct injection valve can replace the fuel pressure sensor. The determination of the fuel pressure FUP can optionally serve to supply a diagnosis of the state of the common rail system and/or of the fuel pressure sensor. In this context, a fault message may be output if the absolute value of the fuel pressure $FUP_{sensor}$ measured by the fuel pressure sensor minus the fuel pressure FUP determined from the induced voltage exceeds a threshold value. That is to say:

$$|FUP_{sensor} - \text{mean}(FUP_{i\_mean})| > \text{threshold value} \quad (7)$$

In this context, $FUP_{i\_mean}$ denotes the mean value for a certain injection valve i over a plurality of injection cycles. The further mean value formation with which the value mean $(FUP_{i\_mean})$ is calculated is carried out over various injection valves i. The threshold value may be dependent on a fuel pressure setpoint value, on an engine speed and on a load state of the internal combustion engine by means of a sucked-in air mass.

It is to be noted that embodiments have been described with respect to different inventive subject matters. In particular, a number of embodiments are described with method claims and other embodiments are described with device claims. However, a person skilled in the art when reading this application will be immediately aware of the fact that unless explicitly specified otherwise, as well as a combination of features which belong to a type of inventive subject matter, any desired combination of features which belong to different types of inventive subject matters is also possible.

In addition it is to be noted that the embodiments described below only represent a limited selection of possible embodiment variants. In particular it is possible to combine the features of individual embodiments with one another in a suitable way, and so for a person skilled in the art the embodiment variants illustrated explicitly here can be considered as disclosing a multiplicity of different embodiments in an obvious manner.

The method described in this application for determining the fuel pressure is based on the following physical effects which occur in the switch-off phase of an injection valve:

1. Firstly, the switching-off of the voltage at the coil of the injection valve leads to a self-induction voltage which is limited by the recuperation voltage. The recuperation voltage is typically somewhat larger than the boosting voltage in terms of the absolute value. As long as the self-induction voltage exceeds the recuperation voltage, a current flow occurs in the coil and the magnetic field in the coil is reduced. The chronological position of this effect is characterized by "I" in FIG. 5.

2. The magnetic force already decreases during the decay of the coil current. As soon as the spring bias and the hydraulic force exceed the decreasing magnetic force owing to the pressure of the fuel to be injected, a resulting force occurs which accelerates the magnet armature together with the valve needle in the direction of the valve seat.

3. If the self-induction voltage no longer exceeds the recuperation voltage, current no longer flows through the coil. The coil is electrically in what is referred to as the "open coil" mode. The eddy currents which are induced during the reduction of the field of the coil decay exponentially owing to the ohmic resistances of the magnetic material of the magnet armature. The reduction in the eddy currents leads in turn to a change in field in the coil and therefore to the induction of a voltage. This induction effect causes the voltage value at the coil to rise to zero volts starting from the level of the recuperation voltage according to the profile of an exponential function. The chronological position of this effect is characterized by "III" in FIG. 5.

4. The magnet armature and valve needle reach their maximum speed directly before the impacting of the valve needle into the valve seat. At this speed, the air gap between the coil core and magnet armature increases in size. Owing to the movement of the magnet armature and the associated increase in the air gap, the remanent magnetism of the magnet armature leads to a movement-induced voltage in the coil. The maximum change which occurs in the induction voltage characterizes the maximum change of speed of the magnet armature (and also of the associated valve needle). Therefore the time of mechanical closing of the valve needle correlates with the occurrence of the maximum movement-induced voltage. This induction effect which is caused by the magnet armature and the associated valve needle speed is superimposed on the induction effect owing to the decay of the eddy currents. The chronological position of this effect is characterized by "IV" in FIG. 5.

5. After the mechanical closing of the valve needle, a bounce process typically occurs during which the valve needle is deflected once more briefly from the closed position. However, owing to the spring voltage and the fuel pressure which is present, the valve needle is pressed back into the valve seat. The closing of the valve after the bouncing process is characterized by "V" in FIG. 5.

The method described herein is now based on determining the fuel pressure present at the injection valve from the movement-induced voltage profile in the switch-off phase. As is explained in detail, this determination may include a number of evaluations for the measured induced voltage profile.

Figure 1:
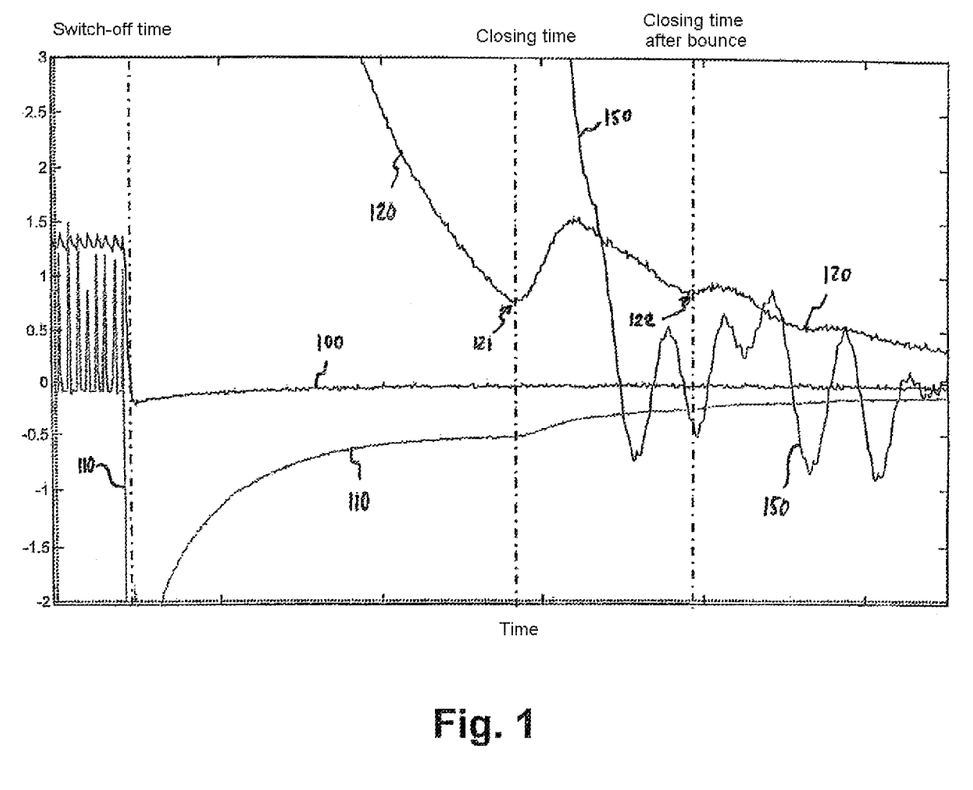
FIG. 1 shows various profiles of signals which occur at the end of the holding phase and in the switch-off phase at an injection valve.

FIG. 1 shows various profiles of signals which are present at an injection valve at the end of the holding phase and in the switch-off phase. The transition between the holding phase and the switch-off phase takes place at the switch-off time, which is represented by a vertical dashed line. The current through the coil is illustrated by the curve provided with the reference symbol 100, in the unit of amperes. In the switch-off phase, an induced voltage signal 110 arises from a superimposition of the induction effect owing to the speed of the magnet armature and speed of the valve needle and the induction effect owing to the decay of the eddy currents. The voltage signal 110 is illustrated in the unit of 10 volts. It is apparent from the voltage signal 110 that the speed of increase of the voltage decreases greatly in the region of the closing time, before the speed of the increase in the voltage increases again owing to the rebounding of the valve needle and magnet armature. The curve provided with the reference symbol 120 represents the chronological derivation of the voltage signal 110. In this derivation 120, the closing time can be seen at a local minimum value 121. After the rebounding process, a further closing time can be seen at a further minimum value 122.

FIG. 1 also shows a curve 150 which illustrates the flow rate of fuel in the unit of grams per second. It is apparent that the measured flow rate of fuel through the injection valve drops very quickly starting from the top just after the detected closing time. The chronological offset between closing time detected on the basis of the evaluation of the actuation voltage and the time at which the measured fuel flow rate reaches the value zero for the first time, results from the limited measuring dynamics during the determination of the flow rate of fuel. Starting from a time of approximately 3.1 ms, the corresponding measurement signal 150 settles at the value zero.

In order to reduce the computing power necessary to carry out the described method for determining the fuel pressure, the derivation 120 can also be determined merely within a limited time interval which contains the expected closing time.

Figure 2:
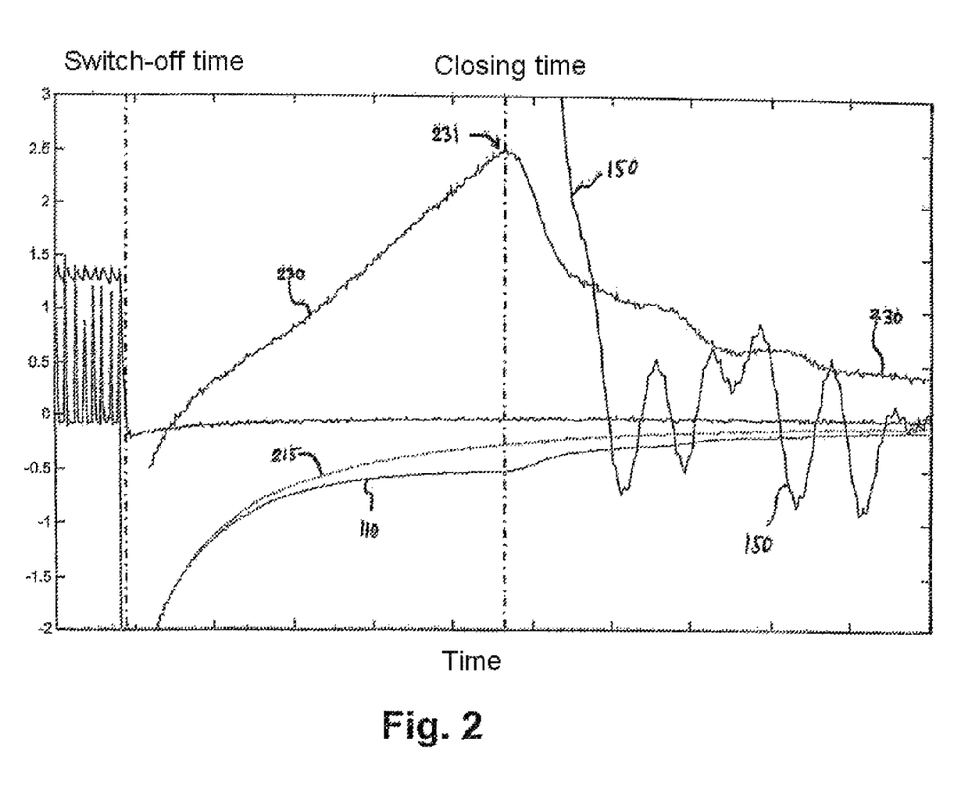
FIG. 2 shows detection of the closing time using a reference voltage profile, which characterizes the induction effect in the coil on the basis of the decay of eddy currents in the magnet armature, according to certain embodiments.

FIG. 2 shows detection of the closing time using a reference voltage profile which characterizes the induction effect in the coil owing to the decay of eddy currents in the magnet armature. FIG. 2 illustrates, like FIG. 1, the end of the holding phase and the switch-off phase. The measured voltage profile 110, which results from superimposition of the induction effect owing to the speed of the air gap and the speed of the identical valve needle and the induction effect owing to the decaying of the eddy currents, is the same as in FIG. 1. The coil current 100 is also unchanged compared to FIG. 1.

The idea now is to use a reference model to calculate the portion of the voltage signal 110 which is caused exclusively by the induction effect owing to the decaying of the eddy currents. A corresponding reference voltage signal is illustrated by the curve with the reference symbol 215. The induction effect owing to decaying eddy currents can be eliminated by determining the voltage difference between the measured voltage profile 110 and the reference voltage signal 215. The difference voltage signal 230 therefore characterizes the movement-related induction effect and is a direct measure of the speed of the magnet armature and of the valve needle and is therefore a measure of the force which occurs and which accelerates the magnet armature. This force which occurs at the magnet armature is dependent on the fuel pressure. The maximum value 231 of the voltage difference $\Delta U\_INJ_{max}$ characterizes the maximum magnet armature speed and/or valve needle speed which is reached directly before the impacting of the needle on the valve seat. The maximum value 231 of the voltage difference $\Delta U\_INJ_{max}$ can therefore be used to determine the actual closing time $t_{close\_}$. In particular it is possible, as shown below, for the maximum value 231 of the voltage difference $\Delta U\_INJ_{max}$ at the actual closing time $t_{close}$ to serve to determine the fuel pressure.

The fuel pressure FUP which is present at the direct injection valve can be determined from the detection of the movement-induced voltages at the coil, in particular from the maximum values determined for voltage differences $\Delta U\_INJ_{max}$.

Figure 3:
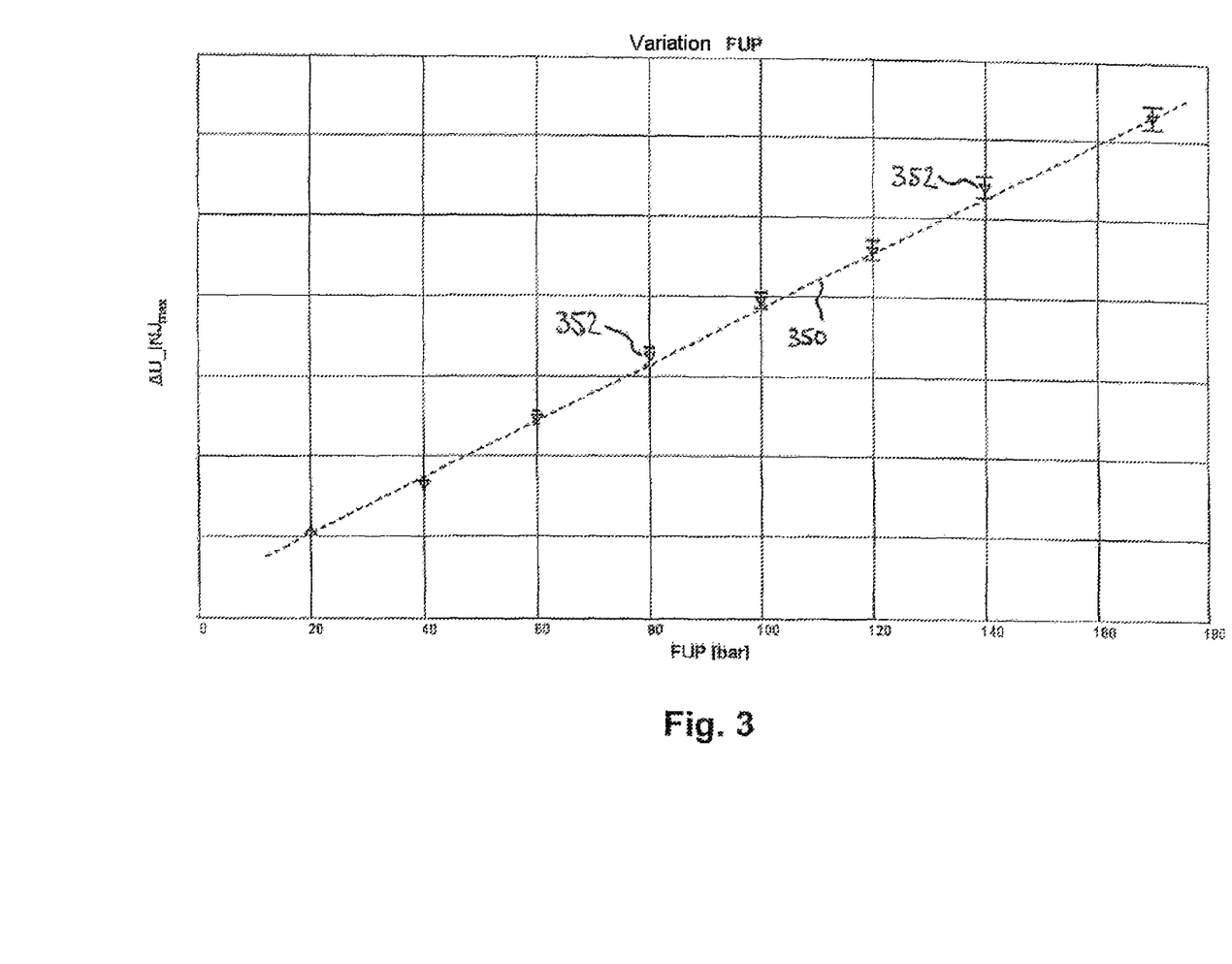
FIG. 3 shows a diagram from which a correlation of measured fuel pressures FUP and measured maximum voltage differences $\Delta U\_INJ_{max}$ is clear.

FIG. 3 shows a correlation for measured fuel pressures FUP and maximum values of the voltage differences $\Delta U\_INJ_{max}$. As is apparent, the measured value pairs 352 formed from the varied fuel pressure FUP and the maximum values of the voltage differences $\Delta U\_INJ_{max}$ lie virtually precisely on a regression straight line 350. The regression straight line 350 can therefore be used to specify the fuel pressure FUP in a wide range for any desired maximum values of the voltage differences $\Delta U\_INJ_{max}$.

Figure 4:
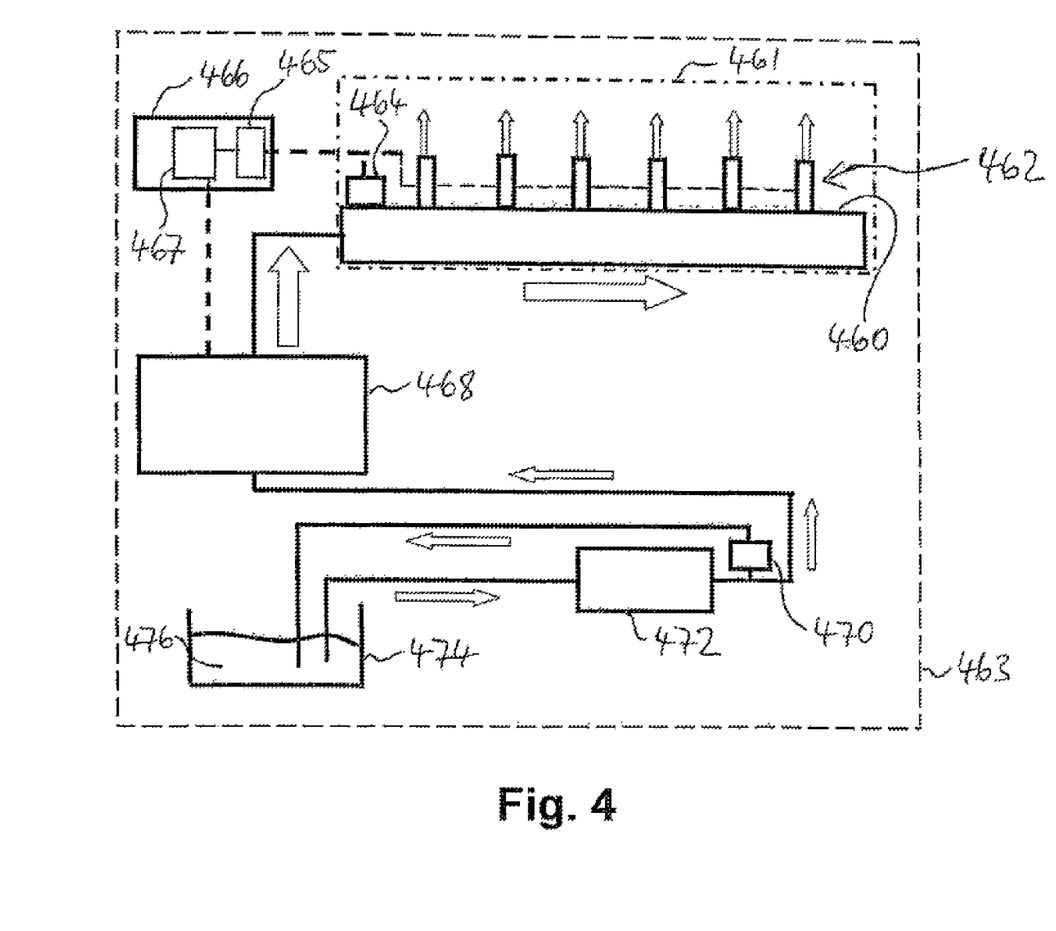
FIG. 4 shows a schematic illustration of a motor vehicle with an internal combustion engine comprising a common rail system, according to certain embodiments.

FIG. 4 shows a schematic illustration of a motor vehicle 463 with an internal combustion engine 461 comprising a common rail system 460. The motor vehicle 463 also has a fuel supply system and a control unit 466 which serves to regulate the supply of fuel 476. The arrows in FIG. 4 serve to clarify the direction of the flow of the fuel 476.

Fuel 476 is directed from a tank 474 to a low pressure fuel pump 472, and from an outlet of the low pressure fuel pump 472 in a loop via a low pressure regulator 470 back into the fuel tank 474. The fuel 476 is conducted from a further branch at the outlet of the low pressure fuel pump 472 to a volume flow regulating valve of a high pressure fuel pump 468. The fuel pressure supplied by the low pressure fuel pump 472 is typically 3-5 bar at the volume flow regulating valve of the high pressure fuel pump 468. The quantity of fuel 476 which ensures that direct injection valves 462 are provided with the desired quantity of fuel 476 in a combustion chamber at a desired fuel pressure is fed to the high pressure fuel pump 468 via the volume flow regulating valve.

The high pressure fuel pump 468 supplies fuel 476 to the common rail system 460 which has six direct injection valves 462 in this illustration. Furthermore, the common rail system 460, which can be considered as a component of the internal combustion engine 461, is a pressure sensor 464 which senses the pressure in the common rail system 460. The pressure sensor 464 is connected to a control unit 466. The control unit 466 has a detection unit 465 for detecting signals, and an evaluation unit 467 for outputting control signals. Furthermore, as shown in FIG. 4, each of the direct injection valves 462 is connected to the detection unit 465 located in the control unit 466, with the result that electrical signals from solenoid drives of the direct injection valves 462 can be transmitted to the control unit 466 in order to be evaluated by the evaluation unit 467. In this way, suitable control signals can be passed on to the high pressure fuel pump 468. Both the pressure of the fuel 476 which is sensed by the pressure sensor 464 and the induced voltages which are detected at the solenoid drives of the direct injection valves 462 can be evaluated by the control unit 466. The control unit 466 can then pass on suitable control signals to the high pressure fuel pump 468 in order to supply the common rail system 460 with fuel 476.

What is claimed is:

1. A method for determining a fuel pressure present at a direct injection valve comprising a solenoid drive having a coil and an armature, the method comprising:
   switching off a current flow through the coil of the solenoid drive, thereby de-energizing the coil, leading to a closing of the direct injection valve,
   during a time period which includes a closing time of the direct injection valve, detecting a voltage induced in the de-energized solenoid drive by decaying eddy currents resulting from the de-energizing of the coil and by a movement of the armature, and
   determining the fuel pressure based on the detected induced voltage.

2. The method of claim 1, comprising determining the fuel pressure based on a maximum value of the induced voltage detected in the solenoid drive.

3. The method of claim 1, wherein a value for the determined fuel pressure present at the direct injection valve is used as a virtual value for a further fuel pressure present at least one further direct injection valve.

4. The method of claim 1, further comprising:
   detecting a further induced voltage which is induced in a further solenoid drive of a further direct injection valve, within a time period that includes a closing time of the further direct injection valve, and
   determining a further fuel pressure based on the detected further induced voltage.

5. The method of claim 1, further comprising:
   detecting the fuel pressure with a pressure sensor,
   comparing the fuel pressure determined based on the detected induced voltage with the fuel pressure detected by the pressure sensor, and
   outputting a fault message if the determined fuel pressure deviates from the measured fuel pressure by more than a predefined threshold value.

6. The method of claim 1, wherein the fuel pressure is determined from a previously known characteristic diagram of maximum values of induced voltages and associated fuel pressures.

7. The method of claim 6, wherein the characteristic diagram is determined by a calibration method that includes:
   operation of the direct injection valve for various fuel pressures, wherein an induced voltage is measured for each fuel pressure, and
   storage of a plurality of value pairs that each comprise a pressure value and an associated voltage value.

8. The method of claim 7, wherein the direct injection valve is operated for various fuel pressures under predefined constant operating conditions.

9. The method of claim 8, wherein the constant operating conditions are defined by maintaining at least one of:
- a stoichiometric air ratio,
- a predefined cooling water temperature,
- a predefined oil temperature, and
- a predefined temperature for a control unit of an internal combustion engine comprising the direct injection valve.

10. The method of claim 7, further comprising adaptation of the value pairs stored in the characteristic diagram using a regression curve.

11. A device for determining a fuel pressure present at a direct injection valve comprising a solenoid drive having a coil and an armature, the device comprising:
- a switch configured to switch off a current flow through the coil of the solenoid drive, thereby de-energizing the coil, leading to a closing of the direct injection valve,
- a detection unit configured to detect a voltage induced in the de-energized solenoid drive within a time period that includes a closing time of the direct injection valve, the voltage being induced in the de-energized solenoid drive by decaying eddy currents resulting from the de-energizing of the coil and by a movement of the armature, and
- an evaluation unit programmed to determine the fuel pressure on the basis of the detected voltage.

12. The device of claim 11, wherein the evaluation unit is programmed to determine the fuel pressure based on a maximum value of the induced voltage detected in the solenoid drive.

13. The device of claim 11, wherein:
- the detection unit is configured to detect a further induced voltage which is induced in a further solenoid drive of a further direct injection valve, within a time period that includes a closing time of the further direct injection valve, and
- the evaluation unit is programmed to determine a further fuel pressure based on the detected further induced voltage.

14. The device of claim 11, wherein:
- the detection unit comprises a pressure sensor configured to detect the fuel pressure, and
- the evaluation unit is programmed to compare the fuel pressure determined based on the detected induced voltage with the fuel pressure detected by the pressure sensor, and output a fault message if the determined fuel pressure deviates from the measured fuel pressure by more than a predefined threshold value.

15. A computer program for determining a fuel pressure present at a direct injection valve comprising a solenoid drive having a coil and an armature, wherein the computer program is stored in computer-readable media and executable to:
- switch off a current flow through the coil of the solenoid drive, thereby de-energizing the coil, leading to a closing of the direct injection valve,
- during a time period which includes a closing time of the direct injection valve, detect a voltage induced in the de-energized solenoid drive by decaying eddy currents resulting from the de-energizing of the coil and by a movement of the armature, and
- determine the fuel pressure based on the detected induced voltage.

* * * * *